United States Patent [19]

Ueda

[11] Patent Number: 4,734,773
[45] Date of Patent: Mar. 29, 1988

[54] IMAGING APPARATUS HAVING HIGH-FREQUENCY ELECTRON PURGING CIRCUIT OPERABLE DURING AN EXPOSURE TIME

[75] Inventor: Kazuhiko Ueda, Yokohama, Japan
[73] Assignee: Victor Company of Japan, Ltd., Japan
[21] Appl. No.: 897,980
[22] Filed: Aug. 19, 1986
[30] Foreign Application Priority Data
Aug. 20, 1985 [JP] Japan .................. 60-182662
[51] Int. Cl.$^4$ ............................ H04N 5/238
[52] U.S. Cl. ..................... 358/213.13; 358/213.19
[58] Field of Search ............... 358/213.11, 213.13, 358/213.19, 213.26, 228, 909

[56] References Cited

U.S. PATENT DOCUMENTS

| | | | |
|---|---|---|---|
| 4,504,865 | 3/1985 | Nishizawa | 358/909 |
| 4,591,917 | 5/1986 | Suzuki | 358/909 |
| 4,597,014 | 6/1986 | Suzuki | 358/909 |
| 4,631,593 | 12/1986 | Kinoshita | 358/909 |

FOREIGN PATENT DOCUMENTS 58-103274  6/1983  Japan .................. 358/909
58-117778  7/1983  Japan .

Primary Examiner—Jin F. Ng
Assistant Examiner—Stephen Brinich
Attorney, Agent, or Firm—Lowe, Price, LeBlanc, Becker & Shur

[57] ABSTRACT

A solid-state imaging apparatus comprises an image sensor having an array of photodiodes, a shift register and a transfer gate for transferring electrons developed in the photodiodes to the shift register in response to a gate control signal applied thereto. An optical unit admits light to the photodiode array during an exposure time in response to a shutter-release pulse. High-frequency clock pulses are supplied to the shift register throughout the exposure time to cause the shift register to purge electrons which have been transferred thereto from the photodiodes bypassing the transfer gate in the absence of the gate control signal. Low-frequency clock pulses are generated immediately following the end of the exposure time and supplied to the shift register to cause it to discharge electrons which have been transferred thereto from the conversion areas through the transfer gate to a utilization circuit.

2 Claims, 4 Drawing Figures

IMAGING APPARATUS HAVING HIGH-FREQUENCY ELECTRON PURGING CIRCUIT OPERABLE DURING AN EXPOSURE TIME

BACKGROUND OF THE INVENTION

The present invention relates to an imaging apparatus and more particularly to an electronic still-picture imaging apparatus which eliminates blooming resulting from excess electrons induced in a solid-state image sensor when it is illuminated with high intensity light.

In solid-state, or CCD (charge-coupled device) image sensors it is known that when the sensor is illuminated with high-intensity light photon-induced electrons may be generated in excess of the capacity of electron wells of the photodiode array and the excess electrons overflow from the intensely illuminated area to the outside. The result is expansion and consequent distortion of the image. One prior art solid-state image sensor has an overflow drain provided in a location adjacent the photodiodes to purge the excess electrons. However, this resduces the amount of area to be used for photoelectrical conversion with a consequential reduction of sensivity.

Another prior art image sensor as shown and described in Japanese Patent Publication No. 58-117778 (published July 13, 1983), excess electrons are purged by application of high-frequency clock pulses to vertical shift register during a constant brief interval following a read cycle. However, due to the constant interval of time, blooming cannot completely be eliminated under all lighting conditions.

SUMMARY OF THE INVENTION

It is therefore an object of the present invention to provide a solid-state imaging apparatus which completely eliminates blooming under all possible lighting conditions.

This object is attained by applying high-frequency clock pulses to a shift register during the time a photodiode array is being exposed to incident light to purge excess electrons overflowing from that array to the shift register through a turn-off transfer gate.

Another object of the invention is to provide an imaging apparatus comprising an image sensor having an array of successively arranged photoelectrical conversion areas, a shift register and a transfer gate for transferring electrons developed in the conversion areas to the shift register in response to a gate control signal applied thereto. An optical unit admits light to the conversion areas for an exposure time in response to a triggering pulse. High-frequency clock pulses are supplied to the shift register throughout the exposure time to cause the shift register to purge electrons which have been transferred thereto from the conversion areas by-passing the transfer gate in the absense of the gate control signal. Low-frequency clock pulses are generated immediately following the end of the exposure time and supplied to the shift register to cause it to discharge electrons which have been transferred thereto from the conversion areas through the transfer gate to a utilization circuit.

BRIEF DESCRIPTION OF THE DRAWINGS

The present invention will be described in further detail with reference to the accompanying drawings, in which.

DETAILED DESCRIPTION

Figure 1:
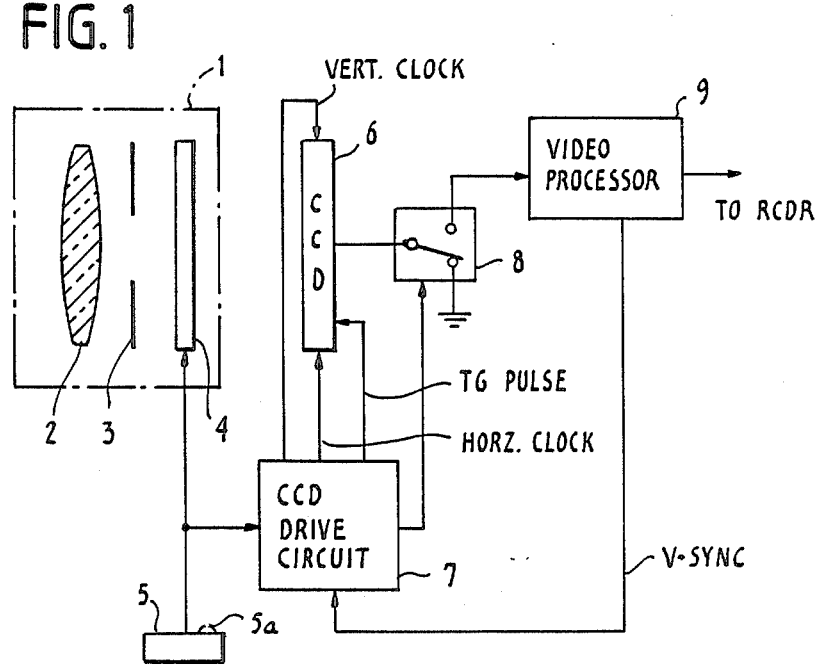
FIG. 1 is a schematic diagram of an electronic still-picture camera embodying the present invention.

An electronic still-picture imaging apparatus represented in FIG. 1 comprises an optical unit 1 through which the optical image of an object is focused onto a charge-coupled device 6. For this purpose, the optical unit 1 includes a focusing lens 2, an iris 3 and a shutter 4 driven by a shutter-release pulse from a shutter actuator 5. Shutter actuator 5 includes a shutter-release button 5a and a variable monostable multivibrator, not shown, which responds to operation of the button 5a by generating the shutter-release pulse of a variable duration as a function of a desired exposure time which is determined in relation to the opening of the iris 3 in a well known manner. This shutter-release pulse is also applied to a CCD drive circuit 7 to which a vertical sync pulse is also applied from a video processor 9. In response to these input signals the CCD drive circuit 7 generates vertical and horizontal clock pulses and transfer-gate drive pulses to the CCD 6. The output of CCD 6 is coupled by way of an electronic switch 8 to the input of video processor 9 in response to a control signal from the drive circuit 7 or to ground in the absence of the control signal. The output of processor 9 is coupled to a suitable image recording device, not shown.

Figure 2:
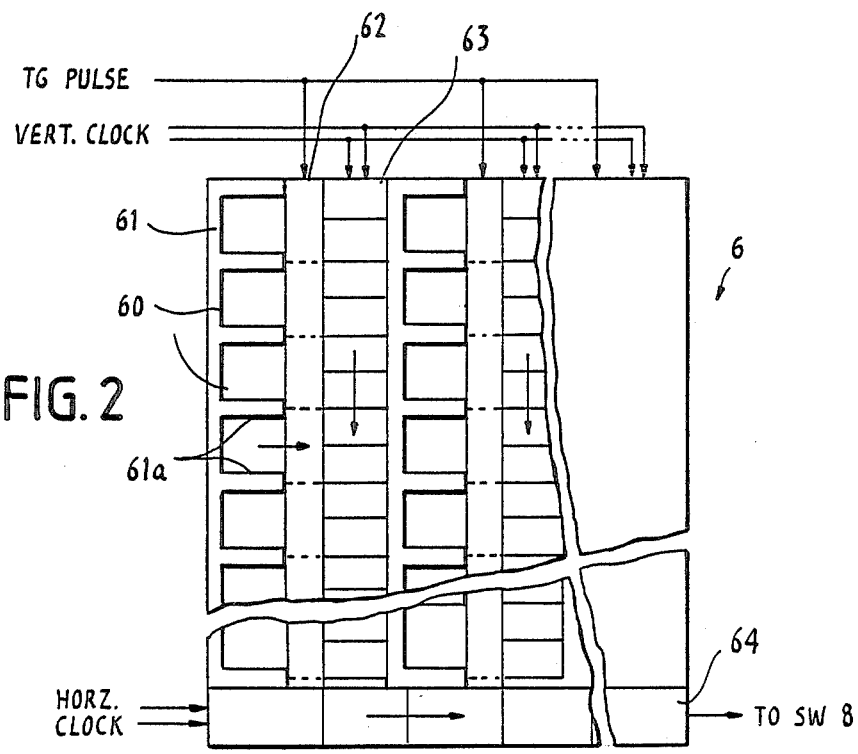
FIG. 2 is an ilustration of details of the charge-coupled device of FIG. 1.

As detailed in FIG. 2, the charge-coupled device 6 comprises successively arranged vertical sets, each set including an array of photodiodes 60, a transfer gate 62 and a vertical CCD or shift register 63. Each photodiode is partially enclosed by a comb-like barrier wall 61 so that it is isolated from adjacent photodiodes and is open on one side to the adjacent transfer gate 62. When nonconductive, the transfer gate 62 has a barrier height which is lower than the barrier height of the isolation wall 61 to allow part of electrons to overflow from a given photodiode to the adjacent vertical shift register 63 bypassing the nonconductive transfer gate 62 when the CCD 6 is illuminated with a spot of light which would otherwise produce an excessively bright spot in the reconstructed image, known as "blooming". Vertical shift registers 63 are supplied with vertical clock pulses of 180-degree phase difference to cause transferred electrons to step along to a horizontal CCD or shift register 64 which is driven by a pair of horizontal clock pulses of 180-degree phase difference at a frequency much higher than the frequency of the vertical clock. The vertically transferred electrons are shifted horizontally to the switch 8.

Figure 3:
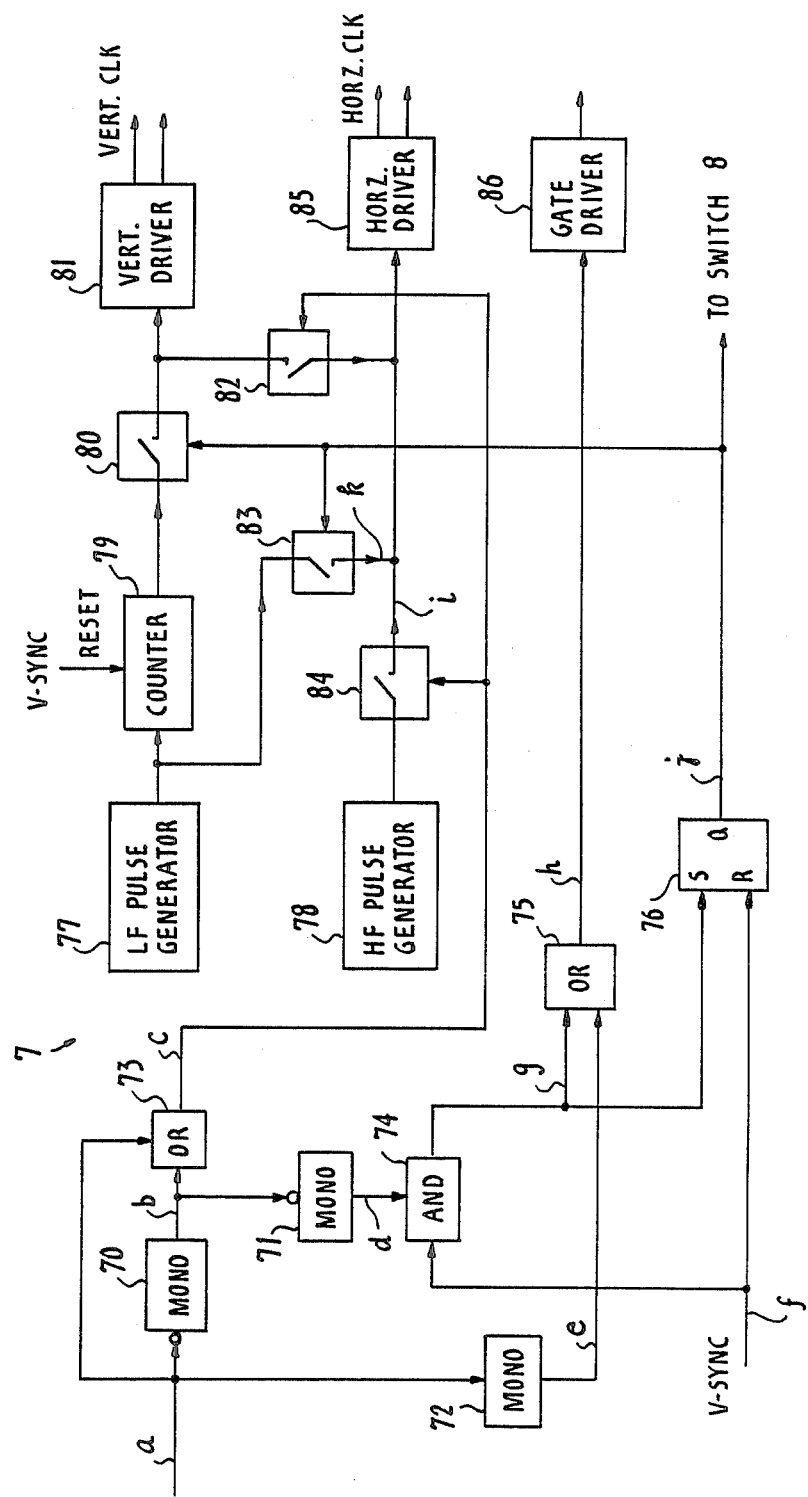
FIG. 3 is a block diagram of the CCD drive circuit of FIG. 1.
Figure 4:
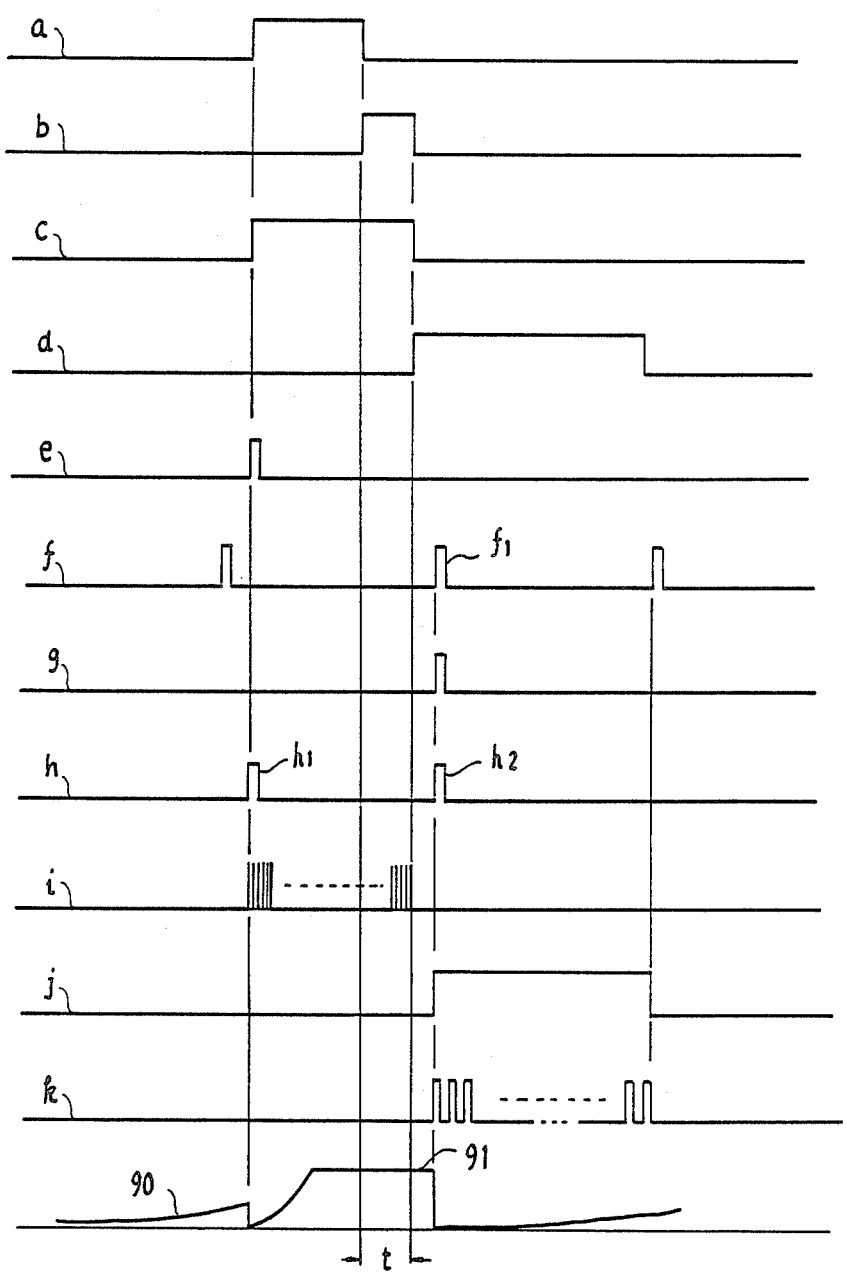
FIG. 4 is a timing diagram for describing the operation of FIG. 3.

In FIG. 3, the CCD drive circuit 7 comprises a monostable multivibrator 70 connected to the shutter actuator 5 to generate a rectangular pulse "b", FIG. 4, immediately following the trailing edge of a shutter-release pulse "a". The output of monostable 70 is combined with the shutter-release pulse in an OR gate 73 to produce an enable pulse "c", the length of which determines the period for purging unwanted electrons through switch 8 to ground. The output of monostable 70 is further applied to a monostable multivibrator 71 to cause it to generate a pulse "d" having a duration slightly longer than the vertical scan period, the output pulse "d" being applied to an AND gate 74 to allow passage of a vertical sync pulse "f" to an OR gate 75 and to the set input of a flip-flop 76. A monostable multivibrator 72 is likewise responsive to the shutter-release pulse to generate a short-duration pulse "e" at the leading edge of the input pulse "a" and applies it to the OR gate 75, which supplies a series of pulses "h" to a gate driver 86 which in turn drives the transfer gates 62 of charge-coupled device 6. The vertical sync pulse is also applied to the reset input of flip-flop 76 to cause it to generate a second enable pulse "j" which determines the period for reading electrons stored in the photodiode array. The second enable pulse "j" is applied to the control terminal of switch 8.

A low-frequency pulse generator 77 generates reading clock pulses for application to the horizontal shift register 64 of CCD 6 during read modes. The low-frequency pulses are supplied through a gate 83 in response to the enable pulse "j" to a horizontal driver 85 and to the input of a counter 79 which divides its frequency by an integer greater than the number of vertical photodiode arrays and supplies its output through a gate 80 in response to the enable pulse "j" to a vertical driver 81.

According to the present invention, a high-frequency pulse generator 78 is provided which generates purging clock pulses for application to the vertical and horizontal shift registers of CCD 6 during a period preceding the read mode. The purging clock pulses are supplied in response to the enable pulse "c" through a gate 84 to the horizontal driver 85 and further through a gate 82 to the vertical driver 81.

Vertical and horizontal drivers convert the input clock pulses into a pair of 180°-phase shifted clock pulses to drive the vertical and horizontal shift registers 63 and 64.

The embodiment of FIG. 3 operates as follows. During the time prior to operation of shutter actuator 5, the CCD 6 develops a potential which increases with time due to the inherent dark current as shown at 90 in FIG. 4. Such a potential is accumulated in the photodiodes 60. When the shutter actuator 5 is operated, the shutter 4 is open to admit light to the CCD 6 and a shutter-release pulse "a" is applied to the monostable 70, causing a pulse $h_1$ to be applied to the transfer gates 62 to transfer the electrons accumulated in the photodiodes to the vertical shift registers 63 and thence to the horizontal shift register 64 and a train of clock pulses "i" to be applied from the high-frequency pulse generator 78 through gate 84 to the horizontal driver 85 and through gate 82 to the vertical driver 81. Since the vertical shift registers 63 are driven at high frequency, the unwanted excess electrons are instantly purged through switch 8 to ground.

Immediately following the pulse $h_1$, the tranfer gates 62 switch to nonconductive state to allow the photodiodes 60 to store electrons in an amount corresponding to the incident light intensity. Assume that the light intensity exceeds a saturation level 91 and electrons overflow the barrier potential of the nonconductive transfer gates 62. Such electrons are captured by adjacent vertical shift registers 63. Since the vertical and horizontal shift registers are continuously driven at high frequency during the subsequent nonconductive state of transfer gates 62, the captured electrons are effectively purged through switch 8 to ground. This purging operation is further continued for a period "t" following the end of exposure to the incident light. The length of period "t" is equal to or greater than the time required for expelling electrons overflowed from the photodiode located in the farthest point from the output terminal of the CCD 6, whereby all the excess electrons are purged.

A vertical sync pulse $f_1$ will then be selected to apply a second gate pulse $h_2$ to the transfer gates 62 to instantly transfer the electrons remaining in the photodiodes 60 to vertical shift registers 63. Gates 80 and 83 are enabled to pass the output of counter 79 and the output of low-frequency pulse generator 77 (which is shown at "k" in FIG. 4) to vertical and horizontal drivers 81 and 85, respectively, to read the stored electrostatic image.

As can be seen from FIG. 2, excess electrons having a potential higher than the barrier potential of the nonconductive transfer gate 62 are caused to pass over it to the vertical shift register 63 and shifted therealong at high speed by the high-frequency vertical clock. Thus, the invention eliminates blooming resulting from electrons which would otherwise overflows the barriers 61a between adjacent photodiodes. The high-speed clock by which the vertical shift register 63 is driven throughout the period of light exposure and thereafter serves to expel the excess electrons which would otherwise overflow into adjacent charge-transfer elements of the vertical shift register 63.

Experiments showed that with a frequency of 7.16 MHz, no blooming occurred for an incident light intensity 2400 times as greater than the saturation level of the charge-coupled device 6.

The foregoing description shows only one preferred embodiment of the present invention. Various modifications are apparent to those skilled in the art without departing from the scope of the present invention which is only limited by the appended claims.

What is claimed is:

1. An imaging apparatus comprising:
   an image sensor having an array of successively arranged photoelectrical conversion areas isolated from each other by insulative regions, shift register means and a transfer gate having a barrier potential lower than a barrier potential of said insulative regions for transferring electrons developed in said conversion areas to said shift register means in response to a gate triggering pulse applied thereto;
   means for generating a triggering pulse;
   an optical unit for exposing said conversion areas to incident light for a time interval in response to said triggering pulse to cause said electrons to develop in said conversion areas;
   means responsive to said triggering device for generating high-frequency clock pulses and supplying the high-frequency clock pulses to said shift register means throughout said time interval to cause the shift register means to purge electrons transferred thereto from said conversion areas bypassing said transfer gate in the absence of said gate control signal; and
   means for generating low-frequency clock pulses immediately following the end of said exposure time and supplying the low-frequency clock pulses to said shift register means to cause it to discharge electrons transferred thereto from said conversion areas through said transfer gate to a utilization circuit.

2. An imaging apparatus comprising:

an image sensor having an array of successively arranged photoelectrical conversion areas, shift register means and a transfer gate for transferring electrons developed in said conversion areas to said shift register means in response to a gate triggering pulse applied thereto;

means for generating a triggering pulse;

an optical unit for exposing said conversion areas to incident light for a time interval in response to said triggering pulse to cause said electrons to develop in said conversion areas;

means responsive to said triggering device for generating high-frequency clock pulses and supplying the high-frequency clock pulses to said shift register means throughout said time interval and for a period longer than said time interval to cause the shift register means to purge electrons transferred thereto from said conversion areas bypassing said transfer gate in the absence of said gate control signal; and means for generating low-frequency clock pulses immediately following the end of said exposure time and supplying the low-frequency clock pulses to said shift register means to cause it to discharge electrons transferred thereto from said conversion areas through said transfer gate to a utilization circuit.

* * * * *